United States Patent [19]

Grahl

[11] 4,087,986

[45] May 9, 1978

[54] CONTROL VALVE

[75] Inventor: Darwin R. Grahl, Newark, N.Y.

[73] Assignee: Parker-Hannifin Corporation, Cleveland, Ohio

[21] Appl. No.: 671,679

[22] Filed: Mar. 29, 1976

[51] Int. Cl.² ............................................. F25C 5/02
[52] U.S. Cl. ...................................... 62/189; 62/354; 137/517; 251/61.3; 251/321
[58] Field of Search ................ 236/92 B; 62/189, 354; 251/61.3, 321, 339; 137/517

[56] References Cited

U.S. PATENT DOCUMENTS

| | | | |
|---|---|---|---|
| 1,178,528 | 4/1916 | Loepsinger | 251/61.3 X |
| 2,034,053 | 3/1936 | Morgan | 236/92 B |
| 2,201,728 | 5/1940 | Hoesel | 236/92 B |
| 2,309,405 | 1/1943 | Matteson | 236/92 |
| 2,327,542 | 8/1943 | Matteson | 138/44 |

*Primary Examiner*—William E. Wayner
*Assistant Examiner*—William E. Tapolcai, Jr.
*Attorney, Agent, or Firm*—John N. Wolfram

[57] ABSTRACT

A valve for regulating flow of fluid in a refrigerating system. The valve includes a valve chamber with an inlet, an outlet and a sensing bore communicating therewith and there is a valve element in the chamber for controlling flow of fluid from the inlet passage past a valve seat to the outlet passage. The valve element is urged by a spring pressed plunger toward an open position and is pressed by a thermostatically actuated piston extending through the sensing bore toward a closed position in opposition to the spring pressure. The sensing bore has a smaller diameter than the valve seat and the valve element is so supported between the piston and the spring pressed plunger whereby there is an effective area on the valve element determined by the difference in areas between the valve seat and sensing bore and which effective area responds to increasing and decreasing fluid pressure within the inlet port to correspondingly decrease and increase the valve opening and thereby maintain substantially constant flow through the valve despite such increasing and decreasing pressures.

10 Claims, 3 Drawing Figures

U.S.Patent  May 9, 1978  4,087,986

CONTROL VALVE

BACKGROUND OF THE INVENTION

Heretofore, ice making machines utilized a refrigeration system wherein an evaporator coil surrounded a conduit means and a control valve monitored the amount of water flowing to the conduit means. A film of water was displaced to the inner wall of the conduit means and converted to ice as the evaporator coil removed heat from the film of water. Generally, an auger within the conduit means displaced the fluid to the inner conduit means wall. Moreover, as the amount of ice formed on the inner wall increased, the auger when rotated scraped particles of ice from the conduit means. These ice particles were transmitted by the rotating auger in the conduit means to an outlet where the ice was gathered in a receptacle or suitable means.

During the operation of the ice making machine the water source varied in pressure and flow and these variances were communicated to the control valve. In addition, the evaporator coil removed varying amounts of heat from the liquid water depending on the ice built up within the conduit means and the stability of the refrigeration system. Consequently, prior art control valves and pressure regulators were required to compensate for these variances so that excessive water was not supplied to the ice making machine.

SUMMARY OF THE INVENTION

The present invention provides a control valve that readily adapts to varying inlet fluid pressures and flows to deliver a constant flow of fluid to an ice making machine. Moreover, the control valve is dependent on the capacity of the evaporator to remove heat from the fluid within the evaporator to thereby regulate the fluid flow to permit only that flow which results in almost total conversion of the fluid to a solid.

The control valve comprises a body having a valve chamber and having an inlet passage, an outlet passage and a sensing bore each communicating with the valve chamber. A valve seat surrounds the outlet passage and there is a valve element in the valve chamber movable toward and away from the valve seat for controlling flow of fluid from the inlet passage to the outlet passage. Connected to the valve body is a thermostatic actuator that includes a piston extending through the sensing bore and engageable with the valve element to urge the same toward a closing position against the valve seat. The actuator includes a diaphragm for moving the piston when a charge on one side of the diaphragm expands in response to an increase in temperature of the evaporator. A spring means acts on the valve element to urge it toward an open position away from the valve seat and in contact with the piston.

In order to adjust the control valve for various sources of fluid with different ranges of flows the seat member and outlet passage wall are threadably engageable with each other so that rotation of the seat member adjusts the valve seat formed by the opening through the seat member. Moreover, a plug member is threadably engageable with the outlet passage wall to adjust the force of a spring biasing the plunger towards the ball valve. These simple adjustment features make the control valve of the present invention readily adaptable to ice making systems requiring various flow rates for different evaporator sizes and heat loads. The fluid charge above the diaphragm may be varied to also change the operating temperature characteristics of the evaporator system.

DETAIL DESCRIPTION

Figures 1, 2:
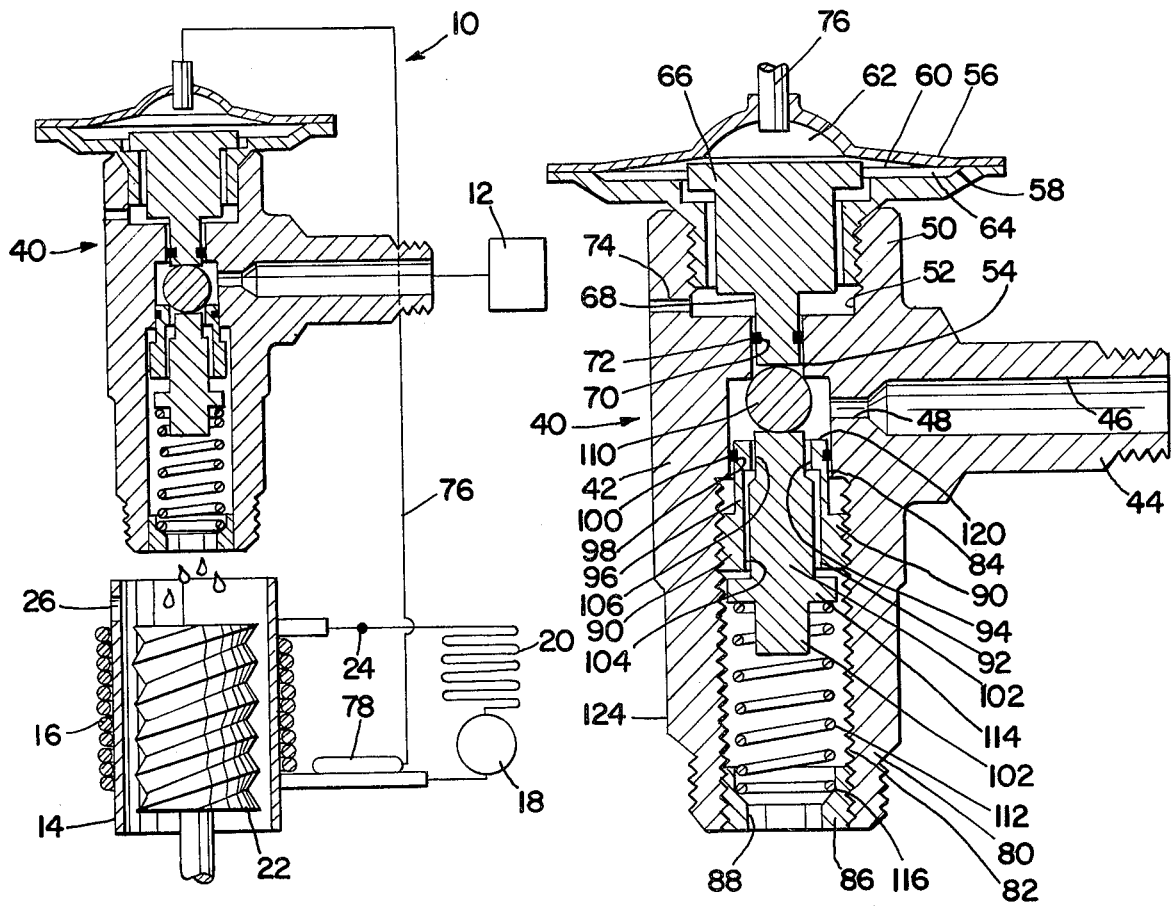
FIG. 1 is a schematic of an ice making system utilizing the control valve of the present invention.
FIG. 2 is a vertical cross section enlarged view of a control valve embodying the present invention.

In an ice making machine, generally illustrated as 10 in FIG. 1, an uncontrolled pressure source of water 12 supplies water to a control valve 40 which communicates the liquid to a conduit means 14. Surrounding the conduit means 14 is an evaporator coil 16 integrated with a refrigeration system which includes a compressor 18, a condensor 20 and a restriction device 24. As the water flows through the conduit means near the evaporator coil the heat is removed from the water to form frozen water or ice on the inner wall of the conduit means.

Rotating within the conduit means 14 is an auger 22 which displaces the water radially outwardly in close proximity to the inner wall of the conduit means. The auger also scrapes particles of ice from the inner wall so that ice particles are discharged from the conduit means via opening 26 to a receptacle or suitable means (not shown).

Illustrated in FIG. 2 is the preferred construction for the control valve 40 of the present invention. A longitudinal body 42 includes a radially extending side boss 44 forming an inlet passage 46 which leads to a reduced inlet bore 48.

The upper portion 50 of the longitudinal body 42 forms a chamber 52 which includes a reduced sensing bore 54. An upper housing 56 and a lower housing 58 carry a diaphragm 60 therebetween by connecting the outer periphery of the upper and lower housing with the outer periphery of the diaphragm. This connection is provided by a weld or other suitable connecting means. The diaphragm 60 forms an upper chamber 62 and a lower chamber 64 and also contacts a piston 66. When the lower housing 58 is threadably connected to body upper portion 50 an extension 68 of the piston telescopes into the reduced sensing bore 54 and includes an annular recess 70 with an O ring seal 72 in the recess to seal the piston extension to the reduced sensing bore 54 while permitting the piston extension to reciprocally move in the reduced sensing bore.

A passage 74 communicates the lower chamber 64 with atmosphere while the upper chamber is charged with a thermostatic media communicating via capillary tube 76 with a bulb 78 which is connected to the outlet of the evaporator 16. Increasing temperatures in the evaporator outlet will correspondingly increase the temperature of the thermostatic media in the bulb which will expand through the capillary tube and upper chamber to urge the piston and extension downward. As is well known in thermostatic devices of this type, the fluid pressure in chamber 62 depends upon the temperature of the fluid media in bulb 78 and is not directly affected by changes of the pressure of fluid in valve chamber 49.

The lower portion 80 of the longitudinal body 42 has an outlet passage 82 leading to a cylindrical chamber 84 which communicates with the reduced sensing bore 54 and the reduced inlet bore 48. The outlet passage is threaded to receive an adjustable plug 86 with a hexagonal opening 88 communicating the outlet passage 82 with the interior of conduit means 14.

A cylindrical seat member 90 includes a hexagonal bore 92 and a circular bore 94 forming a longitudinal opening therethrough. The member is threaded for adjustment and attachment to the lower portion via the threaded outlet passage. Extending upwardly from the threaded portion of the seat member is a cylindrical extension 96 in close sliding fit with the wall of the cylindrical chamber 84. The extension includes a recess 98 for carrying an O ring seal 100 which seals the seat member to the wall of the chamber.

Rotation of the seat member is provided by an allen wrench telescoping into the hexagonal bore 92. As the seat member is rotated the cylindrical extension 96 moves relative to the cylindrical wall of the chamber 84 while remaining sealed thereto.

Telescoping into the opening of the adjustable seat member 90 is a plunger 102 having a first diameter portion 104 and a smaller diameter portion 106. The first diameter portion is in sliding fit with the radially inner edges of the hexagonal bore 92 on the seat member 90 so that a clearance therebetween permits the flow of fluid through the hexagonal bore of the seat member. Moreover, the smaller diameter portion 106 has a diameter that is smaller than the internal diameter of bore 94 such that fluid flows between portion 106 and circular bore 94.

Retained within the chamber 84 is a ball valve or valve element 110 of larger diameter than the internal diameters of reduced sensing bore 54, reduced inlet bore 48 and circular bore 94 so that the ball remains within the chamber when the seat member 90 is threadably attached to the outlet passage. FIG. 1 illustrates the ball valve 110 in a seating position engaging the seat member to close fluid flow through the opening at circular bore 94, while FIG. 2 shows the ball valve unseated from seat member 94 so that fluid flows through the clearances between small diameter portion 106, bore 94, hexagonal bore 92 and first diameter portion 104.

Biasing the plunger towards the ball valve 110 is a spring 112 disposed between a flange 114 on the plunger and a spring rest 116 on adjustable plug 86.

The diameter of bore 94 in seat member 92 is several thousands of an inch larger than the diameter of sensing bore 54. Because spring 112 acting through plunger 102 keeps ball valve 110 in contact with piston extension 68, any increase in pressure in inlet port 46, and hence in valve chamber 84 will act on an effective area of ball valve 110 approximately equal to the difference in cross section areas of bores 54 and 94 to move ball valve 110 closer to its seated position on seat member 90 against the action of spring 112 and thus maintain substantially the same flow through the valve despite the increase in pressure at the inlet port.

Conversely, when there is a decrease in pressure at the inlet port the reduced pressure on the effective area of the ball valve permits spring 112 to move the ball valve further from seat member 90 to increase the flow opening to thus still maintain substantially the same flow rate despite the decreased inlet pressure.

Figure 3:
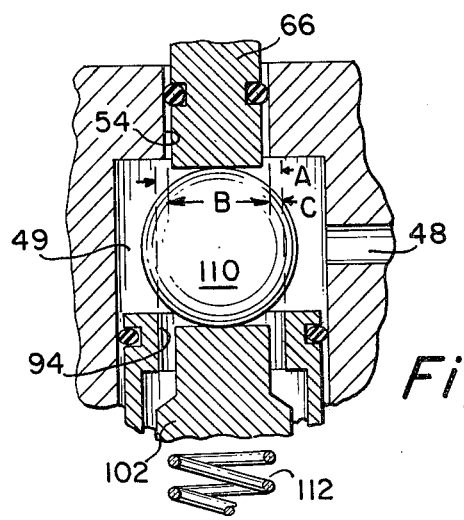
FIG. 3 is an enlarged fragmentary view of a portion of the valve.

The operation of the valve for maintaining substantially constant flow despite variations in the pressure of water from source 12 may be better understood from a consideration of FIG. 3. As shown, bore 94 when projected upwardly defines an area A on the upper surface of ball 110 that is subject to downward pressure of fluid in valve chamber 49. A like area at the lower side of the ball is subject to substantially zero fluid pressure because the fluid when it passes between the ball and seat drops to substantially atmospheric pressure.

Bore 54 defines an area B for the lower end of piston 66 (packing 72 in effect being a part of the piston) that is smaller than area A by a differential area C. This differential area C is utilized in the present invention to maintain constant flow of water from source 12 past ball 110 to outlet port 83. To illustrate, assume for example that the fluid pressure in chamber 62 is 15 psi, that the effective area of the upper side of diaphragm 60 is 1 square inch, that the fluid pressure in valve chamber 49 from source 12 is 20 psi, that the effective area of the lower end of piston 66 is ¼ square inch, that differential area C is 1/20 square inches so that area A is 3/10 of a square inch.

Under the conditions stated, the downward force on piston 66 from diaphragm 60 is 15 lbs. and the upward force on piston 66 across area B is 5 lbs. To keep piston 66 in equilibrium, spring 112 supplied an upward force thereto through plunger 102 and ball 110 of 10 lbs. At the same time, the 20 psi fluid pressure in chamber 49 exerts a downward force of 6 lbs. on the ball across area A. There is also a downward force on the ball of 10 lbs. from piston 66 as a reaction force to the 10 lbs. upward force transmitted by the ball to the piston from spring 112, making the total downward force on the ball 16 lbs. Because spring 112 exerts an upward force of 16 lbs. on the ball, the ball is in equilibrium at a predetermined distance from seat number 120 so that there will be a predetermined rate of flow through the valve at 20 psi inlet pressure.

Now, if the pressure in source 112, and hence in chamber 49, rises to 40 psi, the upward force on piston 66 due to this fluid pressure becomes 10 lbs. Because rise in pressure in chamber 49 has no effect on the pressure in chamber 62, the pressure in the latter remains at 15 psi and the downward force on piston 66 from diaphragm 60 remains 15 lbs. The piston now only needs 5 lbs. of force from spring 112 to hold it in equilibrium. Under this new condition, the downward force on the ball as a reaction to the spring pressure becomes 5 lbs. and the downward pressure across area A becomes 12 lbs., for a total of 17 lbs. To keep the ball in equilibrium, spring 112 must now exert an upward force thereon of 17 lbs. To do this it must compress slightly from the position in which it was exerting 16 lbs. As the spring compresses to its new position, the ball moves downward a corresponding amount and this decreases the opening between the ball and seat 120 so that the amount of flow therebetween at the 40 psi is substantially the same as when the inlet pressure was 20 psi.

In addition, the control valve of the present invention is flow compensating in relation to the heat load of the evaporator 16. With increasing flow through the outlet passage to the conduit means 14 the amount of heat removed from this increasing flow will be correspondingly increased which will raise the temperature of the evaporator near the bulb 78. Consequently, the thermostatic media in the bulb will expand and drive the piston 66 downward to urge the ball valve towards the valve seat thereby decreasing the amount of flow through the valve to the conduit means 14. This reduction in flow will lower the temperature of the evaporator to that temperature associated with a given charge of thermostatic media.

By varying the charge of the thermostatic media the flow rate through the control valve can be varied until a maximum flow rate can be determined which yields the maximum ice formation without excessive discharge of liquid from the conduit means. Therefore, with the charge set for maximum ice formation any increase in the flow rate which would drain undesirable liquid from the conduit means will increase the temperature of the evaporator so that the piston will urge the ball valve towards the valve seat to decrease the flow rate to the maximum flow rate for maximum ice formation without significant liquid draining from the conduit means.

In order to adjust the setting or clean the valve seat the control valve is removed from the ice making system. One allen wrench size is preferably provided for telescoping into the hexagonal bore 92 on the seat member and the hexagonal opening 88 on the adjustable plug 86. Removing the plug with the allen wrench exposes the spring 112 and the plunger 102 for withdrawal from the outlet passage. Next, with the same allen wrench the seat member 90 is rotated and may be removed for cleaning or be adjusted for proper seat opening. Thereafter the plunger and spring are reinserted into the outlet passage and the plug engaged and adjusted on the wall of the outlet passage for setting the bias force of the spring against the plunger.

Although the preferred embodiment of the control valve has been illustrated in conjunction with supplying water to an ice making system, the features of the invention are equally applicable to any control valve which regulates the flow of fluid therethrough.

Moreover, various modifications and alterations of the control valve of the present invention are believed possible by those of ordinary skill in the art and are intended to be covered within the scope of the invention as measured by the claims herein.

I claim:

1. A valve for regulating the flow of a fluid to be cooled, said valve comprising a body having a valve chamber and having an inlet passage, an outlet passage and a sensing bore, each communicating with the valve chamber, a valve element in said chamber and movable toward and away from a valve seat that surrounds the outlet passage for controlling flow of fluid from said inlet passage to said outlet passage, a thermostatic actuator having a piston extending through said sensing bore in sealed slidable relation thereto and into engagement with one side of said valve element for urging the valve element toward a closed position relative to said seat, said piston having an area exposed to fluid in said valve chamber whereby fluid under pressure in said valve chamber acts on the piston in opposition to said thermostatic actuator, a spring acting on the other side of the valve element pressing the valve element toward an open position relative to said seat and against said piston, said seat being larger in diameter than said sensing bore whereby an area larger than said piston area is defined on said valve element and which is exposed to pressure of fluid in said valve chamber to impose a force on said valve element urging the valve element toward said seat in opposition to said spring.

2. The valve of claim 1 in which said valve seat is approximately 0.002 inches greater in diameter than said sensing bore.

3. The valve of claim 1 in which said valve seat is formed on a member that is mounted for adjustment toward and away from said piston.

4. The valve of claim 1 in which said thermostatic actuator includes a diaphragm acted upon on one side by an expandable media and whose other side is vented to atmosphere.

5. The valve of claim 1 in which one end of the sensing bore intersects said valve chamber and the other end thereof is vented to atmosphere, and said sealed relation is intermediate said ends.

6. The valve of claim 3 in which said member has a sealed sliding relationship with a cylindrical wall of said valve chamber.

7. The valve of claim 1 in which there is a plunger between said spring and said valve element, said outlet passage includes a non-circular opening, and said plunger extends through said non-circular opening and has a radial clearance with portions thereof whereby said clearance provides a portion of said outlet passage.

8. In a refrigerating system, a closed refrigeration circuit that includes a compressor, a condensor, an evaporator and a first refrigerant fluid for circulation through said circuit, a source for a second fluid to be cooled, a receiver for said second fluid, a valve for controlling flow of said second fluid from said source to said receiver, said valve including a valve chamber, an inlet passage, an outlet passage and a sensing bore, each communicating with the valve chamber, a valve element in said chamber and movable toward and away from a valve seat that surrounds the outlet passage, a thermostatic actuator having a piston extending through said sensing bore into engagement with said valve element and operable to urge the valve element toward said seat, said piston having an area exposed to pressure of fluid in said chamber to create a force on said piston acting in opposition to said actuator, a spring means acting on the valve element urging the same away from said seat and into engagement with said piston to apply a force to said piston in opposition to said actuator, said evaporator being located adjacent said receiver to withdraw heat therefrom, a temperature sensing device adjacent said evaporator and subject to temperature change in response to temperature changes in the evaporator, said device being connected to the actuator and containing a media that expands with increasing temperature and which acts upon the piston to move the same toward the valve element when the media expands, and said seat being larger in diameter than said sensing bore whereby there is an area on said valve element larger than said piston area and exposed to pressure of said second fluid within said valve chamber to urge the valve element to urge the valve element toward the valve seat.

9. The system of claim 8 in which said spring means maintains said valve element in contact with said piston.

10. The system of claim 9 in which said valve seat has a diameter greater than the diameter of the sensing bore, said piston is in slidable sealed relation to said sensing bore whereby said piston area is determined by the diameter of the sensing bore.

* * * * *